(12) United States Patent
Merritt et al.

(10) Patent No.: US 6,919,023 B2
(45) Date of Patent: Jul. 19, 2005

(54) ACID NEUTRALIZING FILTER CANISTER (75) Inventors: Steven J. Merritt, Kearney, NE (US); Gene W. Brown, Kearney, NE (US); Allan Roush, Thorntown, IN (US); John H. Beard, Kearney, NE (US)

(73) Assignee: Baldwin Filters, Inc., Kearney, NE (US)

( * ) Notice: Subject to any disclaimer, the term of this patent is extended or adjusted under 35 U.S.C. 154(b) by 0 days.

(21) Appl. No.: 10/457,235

(22) Filed: Jun. 9, 2003

(65) Prior Publication Data

US 2004/0140254 A1 Jul. 22, 2004

Related U.S. Application Data (60) Provisional application No. 60/387,243, filed on Jun. 7, 2002.

(51) Int. Cl.$^7$ .......................... B01D 27/08; B01D 27/00; F01M 1/00; C10M 125/10
(52) U.S. Cl. ....................... 210/209; 210/206; 210/266; 210/287; 210/501; 184/6.24; 123/196 A
(58) Field of Search ................................ 210/209, 206, 210/232, 266, 287, 501; 123/196 A; 184/6.24

(56) References Cited

U.S. PATENT DOCUMENTS

| 1,914,999 A | 6/1933 | Maverick et al. |
| 2,196,821 A | 4/1940 | Arnold |
| 2,262,526 A | * 11/1941 | Beare et al. ............ 123/196 A |
| 2,537,992 A | 1/1951 | Gross et al. |
| 2,601,404 A | 6/1952 | Lasky |
| 2,843,268 A | 7/1958 | Kennedy |
| 3,005,555 A | 10/1961 | Bosworth |
| 3,529,719 A | 9/1970 | Graybill |
| 4,075,097 A | 2/1978 | Paul |
| 4,075,098 A | 2/1978 | Paul et al. |
| 4,324,660 A | 4/1982 | Peyton et al. |

(Continued)

FOREIGN PATENT DOCUMENTS

| EP | 0287527 A2 | 10/1988 |
| GB | 507064 | 6/1939 |
| GB | 836993 | 6/1960 |
| WO | WO 86/03687 A1 | 7/1986 |

*Primary Examiner*—Thomas M. Lithgow
(74) *Attorney, Agent, or Firm*—Leydig, Voit & Mayer, Ltd.

(57) ABSTRACT

An acid neutralizing filter construction is provided that may be used as a bypass type filter. The filter includes a canister having an open end. An end plate is secured to the canister at the open end and includes an inlet port and an outlet port to provide for fluid communication with a mounting adaptor of an oil circuit. A reactor housing is arranged inside the canister and comprises a bowl and a lid. The reactor housing defines an entrance port and an exit port. An acid neutralizing bed of acid neutralizing particles is deposited in the reactor housing. The acid neutralizing particles comprises primarily of calcium carbonate compound or other suitable medium which may be provided by crushed limestone. A particulate filter is also arranged in the reactor housing between the acid neutralizing bed and the exit port.

24 Claims, 7 Drawing Sheets

U.S. PATENT DOCUMENTS

| | | | |
|---|---|---|---|
| 4,336,042 A | 6/1982 | Frantz et al. | |
| 4,501,660 A | 2/1985 | Hebert | |
| 4,557,829 A | 12/1985 | Fields | |
| 4,655,914 A | 4/1987 | Wada | |
| 4,733,449 A | 3/1988 | Spearman | |
| 4,751,901 A | 6/1988 | Moor | |
| 4,802,979 A | 2/1989 | Medley, III | |
| 4,832,836 A | 5/1989 | Selsdon | |
| 4,872,976 A | 10/1989 | Cudaback | |
| 4,906,389 A | 3/1990 | Brownawell et al. | |
| 4,946,485 A | 8/1990 | Larsson | |
| 5,042,617 A | 8/1991 | Brownawell et al. | |
| 5,049,269 A | 9/1991 | Shah | |
| 5,068,044 A | 11/1991 | Brownawell et al. | |
| 5,069,799 A | 12/1991 | Brownawell et al. | |
| 5,078,877 A | 1/1992 | Cudaback et al. | |
| 5,112,482 A | 5/1992 | Shaub et al. | |
| 5,180,490 A | 1/1993 | Eihusen et al. | |
| 5,225,081 A | 7/1993 | Brownawell | |
| 5,236,595 A | 8/1993 | Wang et al. | |
| 5,258,118 A * | 11/1993 | Gouritin et al. | 210/206 |
| 5,342,511 A | 8/1994 | Brown et al. | |
| 5,447,627 A | 9/1995 | Loafman et al. | |
| 5,459,074 A | 10/1995 | Muoni | |
| 5,490,930 A | 2/1996 | Krull | |
| 5,525,226 A | 6/1996 | Brown et al. | |
| 5,527,452 A | 6/1996 | Grigoriev et al. | |
| 5,538,542 A | 7/1996 | Watanabe et al. | |
| 5,538,543 A | 7/1996 | Watanabe et al. | |
| 5,562,746 A | 10/1996 | Raether | |
| 5,622,544 A | 4/1997 | Shamine et al. | |
| 5,695,637 A | 12/1997 | Jiang et al. | |
| 5,718,258 A | 2/1998 | Lefebvre et al. | |
| 5,718,743 A | 2/1998 | Donnelly et al. | |
| 5,738,785 A | 4/1998 | Brown et al. | |
| 5,779,772 A | 7/1998 | Unger et al. | |
| 5,792,245 A | 8/1998 | Unger et al. | |
| 5,851,269 A | 12/1998 | Strope | |
| 5,888,383 A | 3/1999 | Cox | |
| 5,904,357 A | 5/1999 | Demirdogen et al. | |
| 5,906,736 A | 5/1999 | Bounnakhom et al. | |
| 5,996,810 A | 12/1999 | Bounnakhom et al. | |
| 6,024,229 A | 2/2000 | Ayers | |
| 6,045,693 A | 4/2000 | Miller et al. | |
| 6,322,697 B1 | 11/2001 | Hacker et al. | |
| 6,379,564 B1 * | 4/2002 | Rohrbach et al. | 210/765 |
| 6,478,958 B1 | 11/2002 | Beard et al. | |
| 6,537,453 B2 | 3/2003 | Beard et al. | |
| 2002/0043495 A1 * | 4/2002 | Beard et al. | 210/416.1 |
| 2002/0185454 A1 * | 12/2002 | Beard et al. | 210/749 |

* cited by examiner

ACID NEUTRALIZING FILTER CANISTER

CROSS-REFERENCE TO RELATED PATENT APPLICATIONS

This patent application claims the benefit of U.S. Provisional Patent Application No. 60/387,243, filed Jun. 7, 2002.

FIELD OF THE INVENTION

The present invention relates to a method and apparatus for neutralizing acid in fluid circulating systems. More particularly, the invention is directed toward an apparatus for removing acids from lubrication oil in oil circulating systems such as the oil systems associated with a diesel engine.

BACKGROUND OF THE INVENTION

Heavy duty diesel engine life, or time to rebuild, has historically been linked directly to piston ring, cylinder liner and/or crank shaft bearing life (referred to as "bearings" for sake of simplicity). Engine design parameters require that these engine components be lubricated, typically with a film lubricant of oil separating these engine components to prevent or minimize direct metal to metal contact. With oil lubricating these bearing surfaces, the principal mechanism associated with engine wear is not metal to metal contact or frictional wear. Instead the primary diesel engine wear component influencing engine life is corrosive wear caused by sulfur and nitrogen containing acids that are formed as products of combustion. One estimate is that more than 70% of heavy duty diesel engine wear is caused by such combustion acid metal corrosion.

Control of diesel engine corrosive wear has historically been accomplished through the inclusion of basic or alkaline chemicals dissolved or suspended in the engine oil that are used to rapidly neutralize combustion acid upon contact with the acid molecules. There have been proposals in the prior art to release alkaline or basic chemicals into the oil or otherwise neutralize acids utilizing a housing arranged along an oil circuit such as is disclosed in U.S. Pat. No. 5,459,074 to Muoni; U.S. Pat. No. 5,718,258 to Lefebvre et al.; U.S. Pat. No. 5,068,044 to Brownawell et al.; U.S. Pat. No. 5,069,799 to Brownawell et al.; U.S. Pat. No. 5,225,081 to Brownawell et al.

Any attempt at implementing acid neutralizing technology into a commercial practical engine oil circuit needs to accommodate several important factors while at the same time providing a sufficiently inexpensive filter cartridge for maintenance intervals to make it commercially practical for fleet managers and the like. As will be appreciated with an understanding of the present invention, these issues have not heretofore been satisfied by the prior art.

BRIEF SUMMARY OF THE INVENTION

One aspect of the present invention is directed toward a novel acid neutralizing filter construction that may be used as a bypass type filter. The filter includes a canister having an open end. An end plate is secured to the canister at the open end and includes an inlet port and an outlet port to provide for fluid communication with a mounting adaptor of an oil circuit. A reactor housing is arranged inside the canister and comprises a bowl and a lid. The reactor housing defines an entrance port and an exit port. An acid neutralizing bed of acid neutralizing particles is deposited in the reactor housing. The acid neutralizing particles comprises primarily of calcium carbonate compound which may be provided by crushed limestone. A particulate filter is also arranged in the reactor housing between the acid neutralizing bed and the exit port. With the foregoing arrangement, a predetermined flow passage is defined through bypass acid neutralizing filter that passes in sequence through the inlet port, the entrance port, the acid neutralizing bed, the particulate filter, the exit port and the outlet port.

Another aspect of the present invention is directed toward a bypass acid neutralizing filter for an oil filtration circuit of an engine. The intended oil filtration circuit includes an oil pump pumping oil along a primary lubrication passage leading to engine bearings and a bypass filtration passage arranged and restricted to pass a minority portion of the oil pumped by the oil pump. A full flow particulate filter is arranged upstream of the engine bearings to filter oil pumped toward the engine bearings. The bypass acid neutralizing filter configured for this bypass circuit comprises an outer housing with an inlet port and an outlet port that are adapted to be interposed along the bypass filtration passage. An inner reactor housing is arranged inside the outer housing. The inner reactor housing has an entrance port and an exit port. An acid neutralizing bed of acid neutralizing particles is contained in the inner reactor housing between the entrance port and the exit port. A bypass particulate filter is arranged in the inner reactor housing downstream of the acid neutralizing bed. With the foregoing arrangement, a predetermined flow passage is defined through bypass acid neutralizing filter that passes in sequence through the inlet port, the entrance port, the acid neutralizing bed, the bypass particulate filter, the exit port and the outlet port. The bypass acid neutralizing filter is configured as a bypass type filter to handle less oil than that passed along the primary filtration path with the bypass particulate filter being sized substantially smaller than the primary particulate filter.

Other aspects, objectives and advantages of the invention will become more apparent from the following detailed description when taken in conjunction with the accompanying drawings.

DETAILED DESCRIPTION OF THE INVENTION

Figure 1:
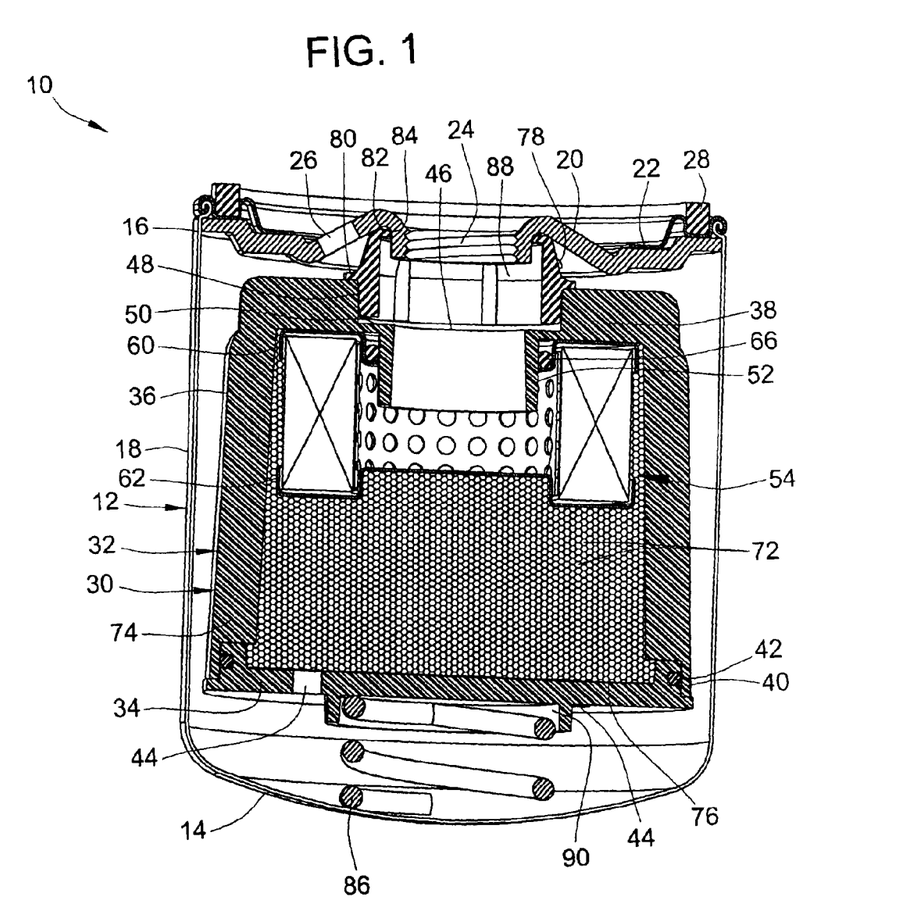
FIG. 1 is a cutaway isometric view of an acid neutralizing bypass spin-on filter cartridge in accordance with an embodiment of the present invention.

Referring to FIG. 1, an acid neutralizing bypass filter 10 is shown in accordance with an embodiment of the present invention. The filter 10 includes an outer housing and an inner reactor housing. The outer housing is provided by a drawn metal canister 12 which includes a closed dome end 14, an open end 16 and a cylindrical side wall 18 therebetween, and an end plate 20 secured to the canister at the open end by means of a seaming lid 22. Alternatively, the end plate 20 can be connected directly to the canister without a seaming lid or via other known filter canister/endplate manufacturing techniques. The end plate 20 includes a central threaded outlet port 24 and a plurality of inlet ports 26 formed through the plate that surround the central outlet port 24. The threading in the outlet port 24 provides for ready spin-on connection of the filter 10 to an oil circuit 100 of an engine such as that schematically shown in FIG. 8. Also as shown, an outer ring gasket 28 is supported on the outside of the outer housing and is supported by the seaming lid 22 for purposes of forming an axial seal against the mounting adaptor of the engine oil circuit 100 schematically shown in FIG. 8.

As shown in the figures, the inner reactor housing is generally a container like structure that may be comprised of a bowl 32 and a lid 34, both of which may be made of plastic material. The bowl 32 is preferably made of a single unitary plastic injection molded body rather than multiple components joined together, and includes a generally cylindrical and slightly tapered outer sidewall 36 and an integrally formed end wall 38. The sidewall 36 extends from the end wall to a free end 40 which is configured to receive and support the lid 34. An O-ring gasket 42 is preferably positioned and arranged between the bowl 32 and the lid 34 for preventing leakage along the free end 40.

The side wall 36 of reactor bowl 32 is concentrically disposed inside the outer side wall 18 of the canister 12 such that a generally cylindrical flow chamber or flow passage is provided to route oil from the inlet ports 26 toward the dome end 14 where oil can enter the reactor housing. The reactor housing has one or more entrance ports 44 and at least one exit port 46 for providing a flow path of oil through the reactor housing. As shown in the drawings, the entrance ports 44 are preferably formed axially through the lid 34, but could also be formed in the bowl 32. At the other end of the reactor housing 30, the end wall 38 of the reactor housing defines a centrally located exit port 46 provided by a central opening formed therein. Around this exit port 46 is provided an annular wall 48 on the external side of the reactor housing 30. This annular wall 48 is connected via a radially inward projecting annular shoulder 50 to a generally cylindrical snout 52 that projects axially inside of the reactor housing 30 toward the lid 34.

Figure 2:
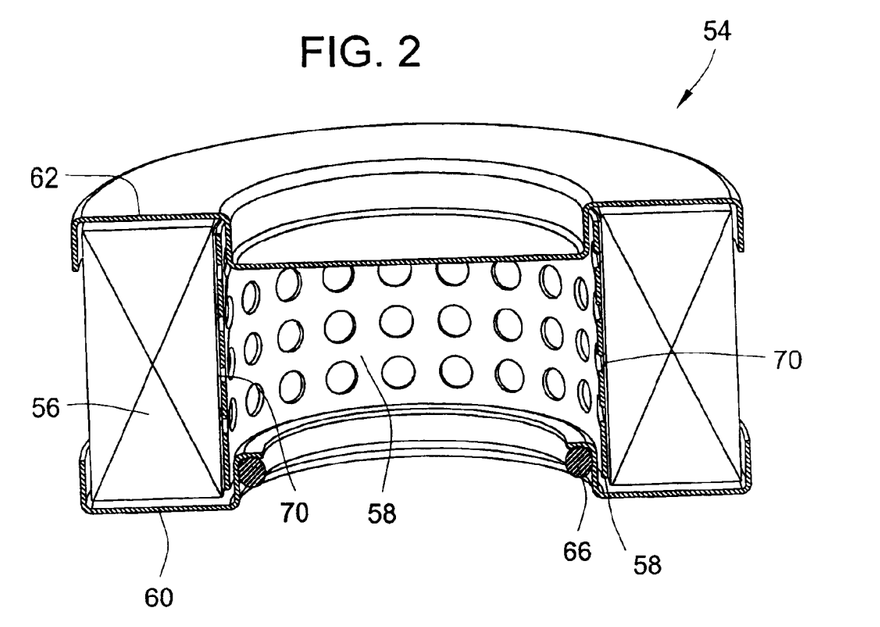
FIG. 2 is an enlarged cutaway view of the bypass filter element that is mounted in the filter cartridge shown in FIG. 1.

An assembled generally cylindrical filter element 54 is arranged inside the reactor housing over the snout 52 and the bowl opening or exit port 46. As illustrated in FIG. 2, the filter housing comprises a cylindrical tube of filter media 56 (which may be pleated filter paper), a perforated metal center tube concentrically arranged inside of the filter media 56, and a pair of top and bottom end caps 60, 62. The filter media 56 is typically potted into the end caps 60, 62. The top end cap includes a central opening that receives the cylindrical snout 52 tightly therethrough for a press fit connection. An O-ring gasket 66 is arranged in a formed annular retaining structure 68 on the inner periphery of the top end cap 60 for providing a seal between the snout 52 and the filter element 54 to better ensure that the acid neutralizing medium of the reactor does not exit the reactor through the exit port 46 as seen in FIG. 1.

In accordance with an aspect of the present invention, a cylindrical tube of mesh screen 70 is provided between the tube filter media 56 and center tube 58 to provide a further backup to the tube of filter media to ensure that acid neutralizing particles are retained in the reactor housing 30. The bottom end cap 62 is closed such that fluid flowing from the entrance ports 44 to the exit port 46 are directed and forced through the cylindrical tube of filter media 56. As shown herein, the filter element 54 preferably has an axial length that is substantially shorter than the axial length of the reactor housing to provide more room to receive acid neutralizing reactor media.

Because this filter 10 is designed as a replaceable filter cartridge in a bypass system, the filter element 54 is not designed as a full flow filter but designed as a bypass filter with a primary function of ensuring that reactor media particles do not enter the oil circuit. Secondary functions such a fine particulate filtration can also be provided if desired. Thus, the bypass filter element 54 is designed to be substantially smaller than the full flow filter as will be later described with reference to FIG. 8.

Figure 3:
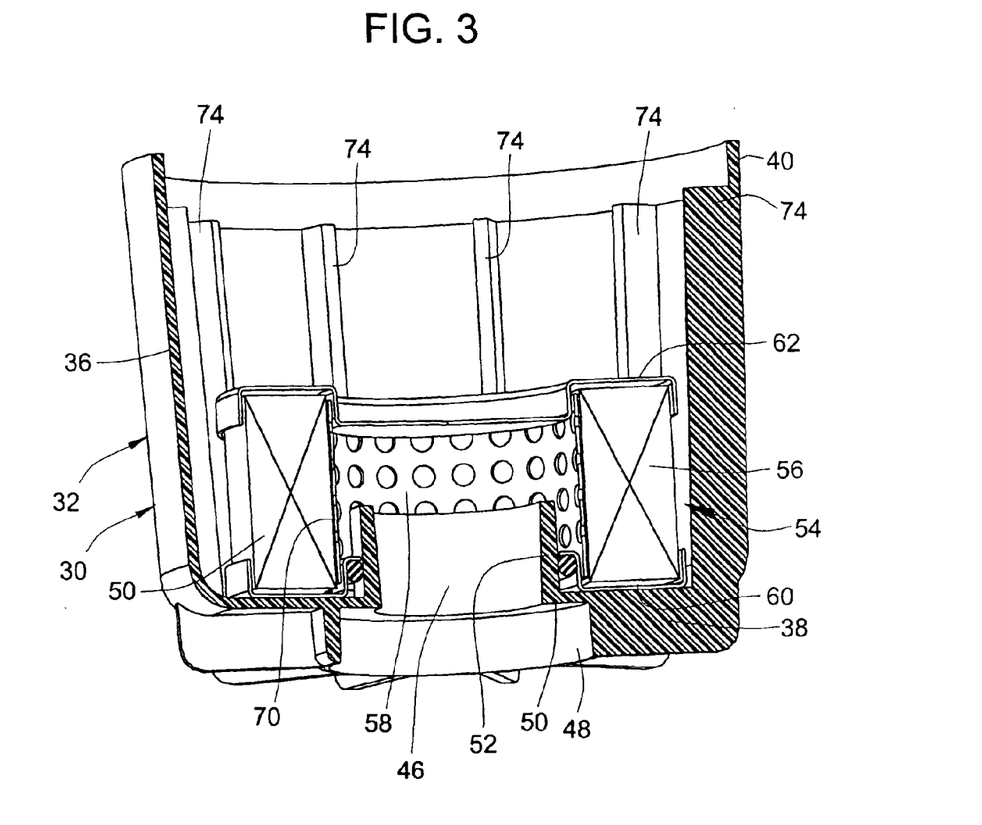
FIG. 3 is an enlarged cutaway isometric view of the bypass filter element arranged in an empty reactor housing for making the filter cartridge shown in FIG. 1.
Figure 4:
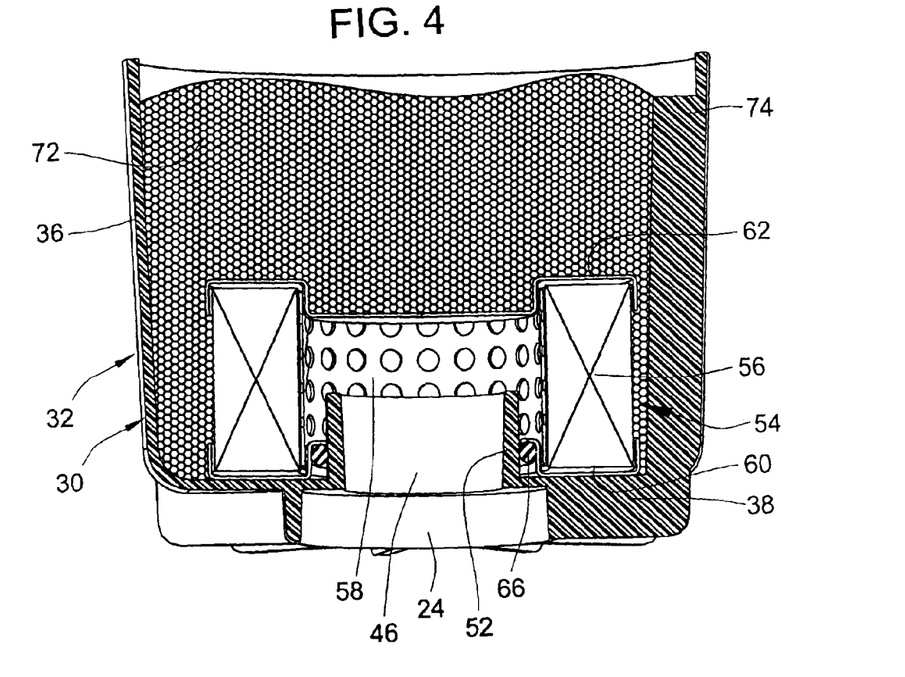
FIG. 4 is an enlarged cutaway isometric view of the reactor housing shown in FIG. 3 but filled with reactant material such as crushed limestone material which comprises primarily calcium carbonate material.

With a relatively small filter element 54 being provided there is a large amount of void space in the reactor housing (e.g. see FIGS. 3 and 4) which is filled with suitable acid neutralizing media. As shown herein, the acid neutralizing media comprises primarily calcium carbonate compound which is an extremely inexpensive compound as it occurs naturally as limestone (limestone technically is a naturally occurring substance that primarily comprises calcium carbonate but may also include magnesium carbonate and other trace minerals or materials). Thus, the entire space of the reactor housing between the filter element 54 and the bowl 32 and lid 34 is preferably filled with crushed limestone particles 72 that provide calcium carbonate, or other suitable material that is sufficiently inexpensive to provide a commercially practical filter. As illustrated in FIG. 1, the limestone is crushed to be fine enough to provide for a large surface area for calcium carbonate molecules while at the same time not being too fine so as to impede or prevent flow of oil through the reactor housing 30. As oil flows through the reactor housing, acid molecules contained within the oil will come into contact with the outer surface of the limestone particles 72 and react with calcium carbonate contained therein thereby causing a reaction to take place in which the acid molecule is neutralized. This neutralization effectively reduces the amount of acid molecules in the oil thereby reducing wear on the bearing surfaces of the engine. The neutralization may also prolong the maintenance service interval for an oil change.

Preferably, the reactor housing including the bowl 32 and lid 34 are molded from plastic material to provide for relatively inexpensive manufacture while allowing for more complex shapes to be formed. The bowl 32 preferably includes a plurality of axially extending ribs 74 on its inner periphery arranged in an angularly spaced array about the axis that serve to strengthen the bowl 32, and also provide a means for centering the filter element 54 over the snout when it is inserted during assembly, and for also providing a stop shoulder for the lid 34 at the free end 40.

Figure 5:
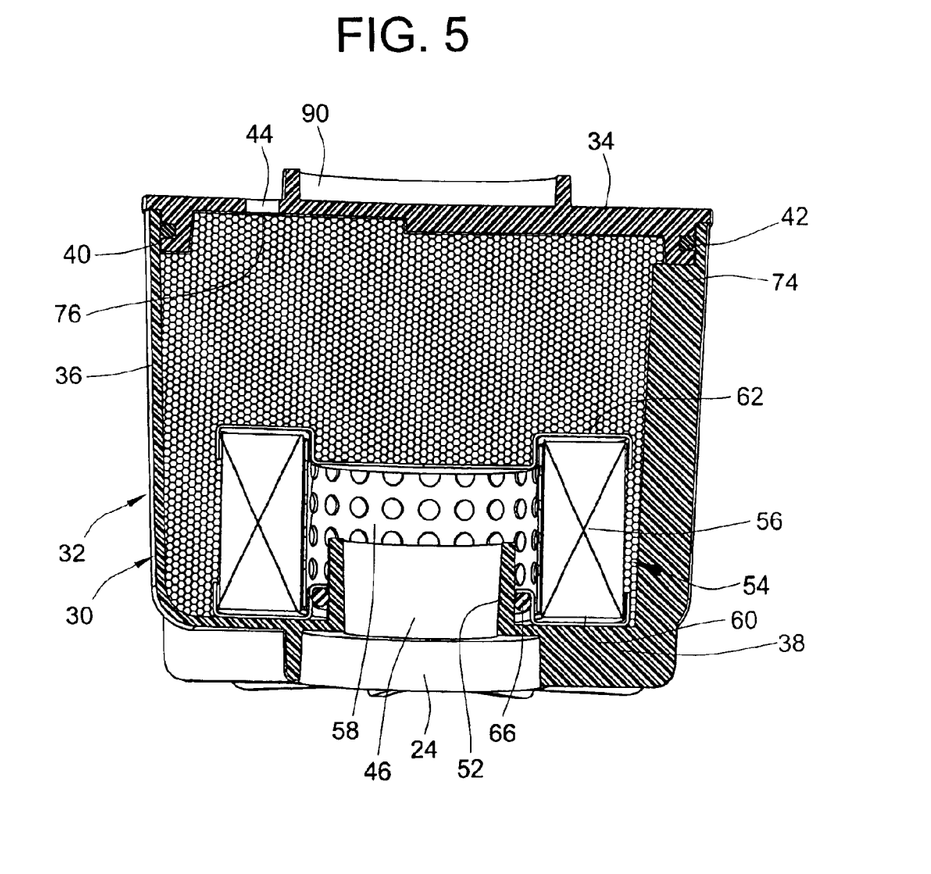
FIG. 5 is an enlarged cutaway isometric view of the reactor housing filled with reactant and installed with a lid.
Figure 6:
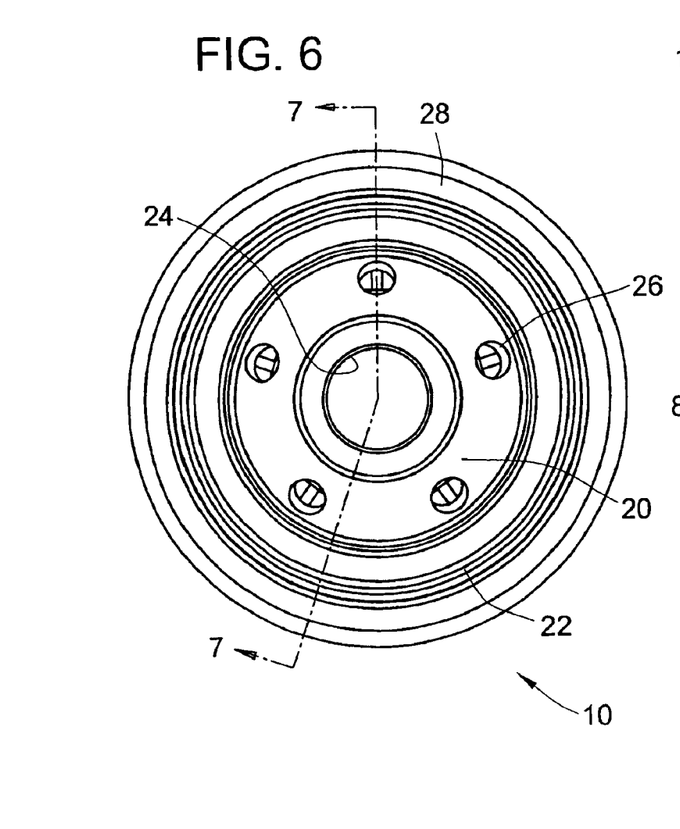
FIGS. 6 and 7 are end and cross-sectional views of the acid neutralizing bypass spin-on filter shown in FIG. 1.
Figure 7:
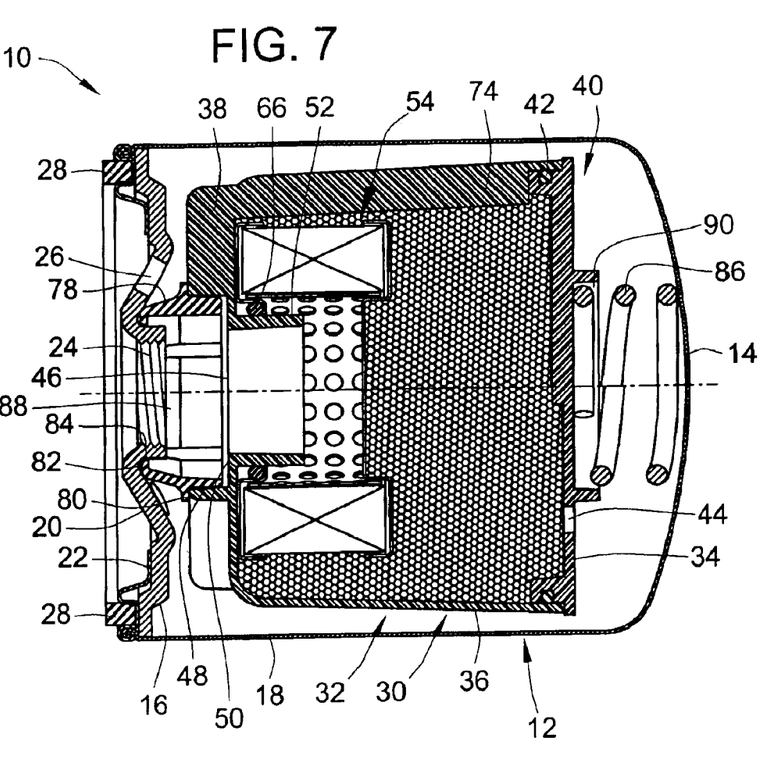

A further feature achieved through molding is that fine mesh material 76 is preferably molded directly into and over the reactor entrance ports 44 as illustrated in FIG. 5. In this manner, the crushed limestone particles 74 is retained within the reactor housing and not allowed to enter the outer canister 12. The fine mesh material 76 is finer than the size of the crushed limestone particles 72. This provides the feature that when oil is not flowing through the acid neutralizing bypass filter 10, limestone particles do not somehow migrate into the oil fluid circuit by backing up through the external inlet ports 26 of the bypass filter 10.

The exit port 46 of the reactor housing 30 is connected to the outlet port 24 of the outer housing via a cylindrical adaptor seal 78 extending therebetween. The adaptor seal 78 is received into the opening or exit port 46 of the bowl 32 and is concentrically arranged within the annular wall 48. The adaptor seal 78 preferably includes an outwardly projecting annular flange that is acted upon by higher pressure on the inlet side of the filter and is thereby pressed into sealing engagement against the end wall 38 of the bowl 32 to prevent leakage therebetween. The adaptor seal also includes an annular sealing edge 82 that is received into an annular pocket 84 that is formed integrally into the underside of the outer end plate 20. A coil spring 86 supported by the closed dome end 14 of the outer canister 12 engages the lid 34 to maintain the lid 34 axially against the reactor bowl 32 and also urges the adaptor seal 82 against the end plate 20 such that an axial seal is formed between the end plate 22 and the annular sealing edge 82 of the adaptor seal 78. The cylindrical adaptor seal 78 includes a central passage 88 that directly connects the exit port 46 to the external outlet port 24.

Figure 8:
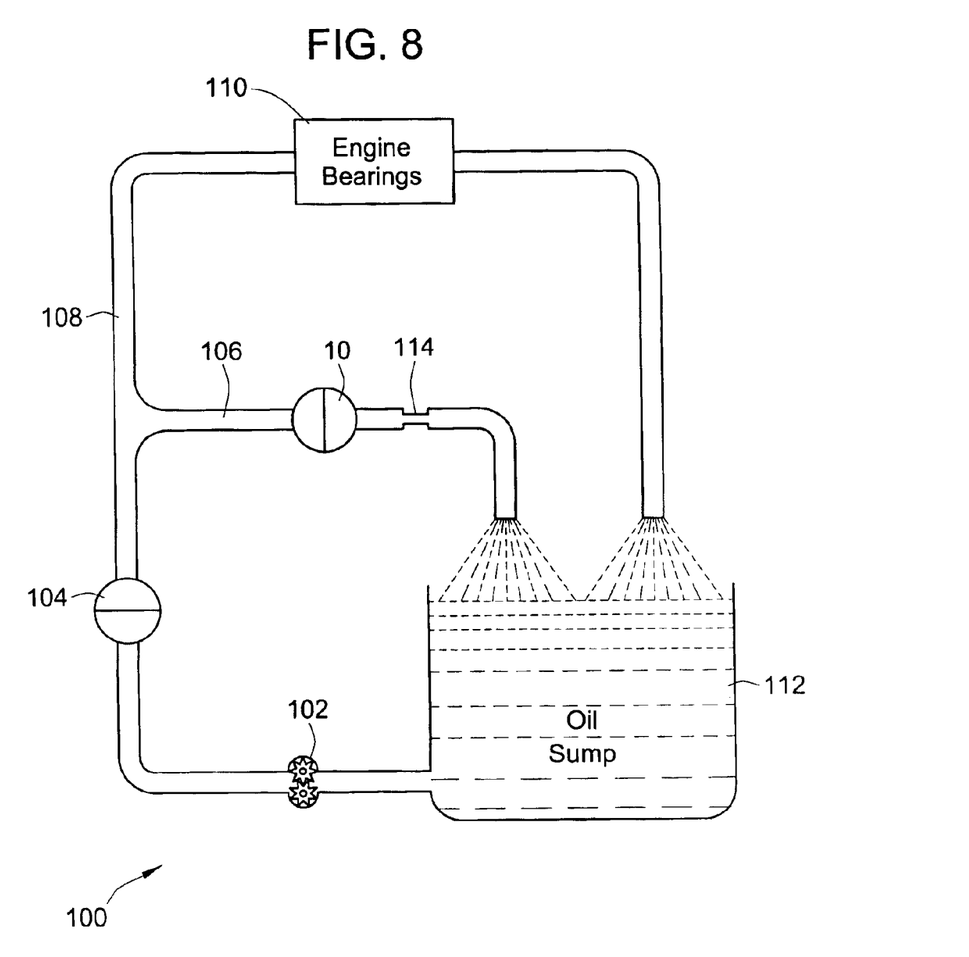
FIG. 8 is a schematic representation of a full flow and bypass circuit of an engine showing the bypass filter of the present invention incorporated thereon in accordance with an embodiment of the present invention.

As noted above, a preferred embodiment of the present invention is in the form of a bypass filter 10 for an engine oil circuit 100 which is schematically indicated in FIG. 8. This oil circuit 100 includes an oil pump 102 that pumps oil along a passage first through a full flow filter 104 that passes oil pumped by oil pump 102. Thereafter, there is a split in the circuit and the oil can either pass through the bypass line 106 or a primary oil line 108. With all of the oil that is jetted toward the bearings 110 through the primary oil line 108 passing through the full flow particulate filter 104, undesirable particulates (sized greater than the porosity of the full flow filter) are removed by the full flow particulate filter 104 prior to reaching the bearings 110, hence the term "full flow" (the bearings 110 represent and are meant to include the metal to metal sliding surfaces as is described in the background section). During engine operation it is critical to have the bearing surfaces 110 continuously lubricated via oil to provide a thin film that effectively substantially prevents metal to metal contact thereby preventing wear. Therefore, substantially all of the oil passing through the full flow particulate filter is routed through the primary oil line 108 and through the bearings 110 where thereafter eventually returns to the oil pan or sump 112. However, a small portion of the oil is routed along the bypass line 106 and passed through the bypass filter 10 of the present invention. A restriction orifice 114 which may be roughly about 0.105" in diameter strictly limits the amount of oil passing along the bypass line 106. During regular operation, about 10% of the total flow passing through the full flow filter 104 (but it may be designed to be anywhere between roughly 5% and 20% for normal engine operation). Importantly, not too much oil is passed through the bypass line 106 otherwise, when oil pressure drops when the engine is idling, insufficient pressure may not be available to supply sufficient oil to the bearings 110 of the engine. This is because the restriction orifice 114 stays the same despite less oil being pumped.

Also a critical aspect of the present invention is that not all oil pumped by the oil pump 102 is passed through the bed of limestone particles 72 by virtue of the bypass filter cartridge 10 being mounted in the bypass line 106 rather than the primary oil line 108 or where the full flow particulate filter 104 is located. The importance of this is that there is the possibility that the relatively fine crushed particle size of the limestone particles 72 could become clogged either through compaction, sludge forming and being retained within the limestone particle bed, a combination of these factors or otherwise. Simply put, the inventors of the present invention have determined that it is too much of a risk to consider placing the limestone bed along the full flow filter path as there would be an increase potential for plugging the oil circuit and thereby preventing the critical oil flow to the bearings 110. By placing the bed of crushed limestone particles 72 on the bypass line, the limestone particles can be crushed to be significantly smaller and thereby provide much more acid reacting surface area than could otherwise be obtained along the primary flow path to the bearings 110. As a result, the way the invention has been incorporated, the acids contained in the oil are systematically removed by a small portion of the oil containing such acids passing through the bypass line and bypass filter thereby reducing corrosion and wear of metal components. At the same time, by placing the bypass filter in parallel circuit with the bearings 110, there is not a chance that oil flow to the bearings will be plugged by virtue of the bed of relatively finely crushed limestone particles 72.

A further advantage of the present invention is that the bypass filter cartridge 10 can be made in a very economical fashion since the components to the bypass filter are made using in part conventional filter manufacturing technologies, very inexpensive acid neutralizing media which occurs naturally (e.g. limestone) which is anticipated to cost only a couple cents per filter at most, an extremely small bypass filter element that can also be inexpensive as a result of its very small size needed only to ensure that particles of limestone material do not enter the fluid circuit. The bypass filter element 54 can be sized to be substantially smaller and configured to pass substantially less oil than the full flow filter 104 which is schematically illustrated in FIG. 8. This also keeps the cost of the filter cartridge 10 to be sufficiently inexpensive to make it practical and economically for commercial applications while achieving acid neutralization and extended service intervals and/or reduced corrosive wear and extended engine life.

The method of manufacturing the present invention also provides a very cost effective way to manufacture the disclosed bypass filter 10 to make it commercially practical. Accordingly, the assembly of the filter 10 starts with the assembly of the small bypass filter element 54 as shown in FIG. 2. The tube of filter media 56 and a meshed lined center tube 58 are potted into open and closed end caps 60, 62 (although a partial length media tube 56 is shown, the figure bypass element 54 could also be a full length tube extending the axial length of the reactor housing). The tube of filter media 56 may be pleated cellulose filter paper, depth filtration tube media, or other suitable filtration media. The bypass element 54 is then assembled into the reactor housing 30 with the O-ring seal gasket 66. The reactor housing 30 includes the hollow snout 52 on the internal side of the housing to mate and seal with the filter bypass element 54. The open end cap 60 has an inside diameter that is slightly smaller than the mating snout in the reactor housing 30 that provides for a press fit connection. Other methods to retain the element could also be used including potting and/or glue or binder material or other mechanical retainer mechanism. The reactor housing 30 is then ready to be filled with the reactant which in this case is primarily calcium carbonate as provided by crushed limestone particles 72. The calcium carbonate is filled and compacted into the reactor housing 30. A plastic lid 34 is then installed as shown in FIG. 5. The lid 34 is snapped inside the bowl 32 of the reactor housing and an O-ring located in an O-ring groove on the lid 34 provides a seal.

The remaining spin-on canister 12 is assembled as any ordinary spin-on lube filter with the reactor replacing the filter element. This assembly starts with a base plate 20 which has a seaming lid 22 welded to it. The adaptor seal 78 is placed on the base plate 20 followed with the assembled reactor housing 30. A spring is set in the spring pocket 90 defined by the lid 34 and the formed canister 12 is placed over the spring 86. The canister 12 and seaming lid 22 are then double seamed together to secure the end plate 20 to the outer housing. Finally, the outer gasket 28 is installed in the seaming lid 22.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An acid neutralizing filter, comprising:
   a canister having an open end;
   an end plate secured to the canister at the open end, the end plate having an inlet port and an outlet port;
   a reactor housing arranged inside the canister, the reactor housing comprising a bowl and a lid, the reactor housing comprising an entrance port and an exit port;
   an acid neutralizing bed of acid neutralizing particles in the reactor housing, the acid neutralizing particles comprising primarily of calcium carbonate;
   a particulate filter in the reactor housing between the acid neutralizing bed and the exit port;
   a predetermined flow passage through the acid neutralizing filter passing in sequence through the inlet port, the entrance port, the acid neutralizing bed, the particulate filter, the exit port and the outlet port; and
   wherein the bowl includes an end wall and a tubular sidewall, the sidewall having a plurality of ribs that extend axially and that are angularly spaced.

2. The acid neutralizing filter of claim 1 wherein the particulate filter comprises a tubular filter media contained between end caps, and wherein the particulate filter is concentrically arranged inside of the ribs.

3. The acid neutralizing filter of claim 1, wherein the end wall has a central opening providing said exit port and communicating with the outlet port.

4. The acid neutralizing filter of claim 3, wherein the bowl defines an annular wall surrounding the central opening, further comprising an annular adaptor seal member extending into the central opening.

5. The acid neutralizing filter of claim 4, wherein the annular seal member includes a radially outward flange engaging the end wall of the bowl and an annular tip engaging the end plate, further comprising a spring supported by the canister biasing the bowl toward the endplate and thereby compressing the seal member between the bowl and the end plate.

6. The acid neutralizing filter of claim 1, wherein the bowl and the lid of the reactor housing are molded from plastic material.

7. The acid neutralizing filter of claim 6, further comprising mesh material molded into the reactor housing over the entrance port for retaining particles of the acid neutralizing bed in the reactor housing.

8. An acid neutralizing filter, comprising:
   a canister having an open end;
   an end plate secured to the canister at the open end, the end plate having an inlet port and an outlet port;
   a reactor housing arranged inside the canister, the reactor housing comprising a bowl and a lid, the reactor housing comprising an entrance port and an exit port;
   an acid neutralizing bed of acid neutralizing particles in the reactor housing, the acid neutralizing particles comprising primarily of calcium carbonate;
   a particulate filter in the reactor housing between the acid neutralizing bed and the exit port;
   a predetermined flow passage through the acid neutralizing filter passing in sequence through the inlet port, the entrance port, the acid neutralizing bed, the particulate filter, the exit port and the outlet port; and
   wherein the particulate filter comprises a tube of filter media, first and second end caps secured to opposing ends of the tube of filter media, a perforated center tube concentrically arranged inside of the tube of filter media and a cylindrical ring of mesh material between the tube of filter media and the perforated center tube.

9. The acid neutralizing filter of claim 8, wherein the first end cap has a central opening communicating with the exit port through the bowl and the second end cap is closed, and wherein the particulate filter has an axially length that is substantially shorter than the reactor housing, such that the second end cap is spaced axially from the lid with acid neutralizing particles contained therebetween.

10. The acid neutralizing filter of claim 9, wherein the reactor housing defines said entrance and said exit port proximate opposed axial ends of the reactor housing, wherein oil flow through the reactor housing is imparted with substantial axial and radial travel components.

11. The acid neutralizing filter of claim 9, wherein the bowl integrally includes an annular snout projecting inside of the bowl and through the first end cap has a central opening.

12. An acid neutralizing filter, comprising:

a canister having an open end;

an end plate secured to the canister at the open end, the end plate having an inlet port and an outlet port;

a reactor housing arranged inside the canister, the reactor housing comprising a bowl and a lid, the reactor housing comprising an entrance port and an exit port;

an acid neutralizing bed of acid neutralizing particles in the reactor housing, the acid neutralizing particles comprising primarily of calcium carbonate;

a particulate filter in the reactor housing between the acid neutralizing bed and the exit port;

a predetermined flow passage through the acid neutralizing filter passing in sequence through the inlet port, the entrance port, the acid neutralizing bed, the particulate filter, the exit port and the outlet port; and wherein the bowl includes an end wall and a tubular sidewall terminating in a free end, the lid engaging the free end, and wherein the end wall defines a central opening providing said exit port communicating with the outlet port, and wherein the lid defines a plurality of said entrance ports, the reactor housing being arranged such that oil flows, in sequence, through the inlet port down an annular space defined between the reactor housing and the canister to a closed end dome portion of the canister, axially through entrance ports defined by the lid, axially and radially through the acid neutralizing bed, through the particular filter and then through the exit and outlet ports.

13. The acid neutralizing filter of claim 12, wherein the acid neutralizing particles consist essentially of crushed limestone particles.

14. A bypass acid neutralizing filter for an oil filtration circuit of an engine having an oil pump pumping oil along a primary lubrication passage leading to engine bearings and a bypass filtration passage arranged and restricted to pass a minority portion of the oil pumped by the oil pump, a full flow particulate filter being arranged upstream of the engine bearings to filter oil pumped toward the engine bearings, the bypass acid neutralizing filter comprising:

an outer housing adapted to be interposed along the bypass filtration passage, the outer housing having an inlet port and an outlet port;

an inner reactor housing inside the outer housing, the inner reactor housing having an entrance port and an exit port;

an acid neutralizing bed of acid neutralizing particles contained in the inner reactor housing between the entrance port and the exit port;

a bypass particulate filter in the inner reactor housing arranged downstream of the acid neutralizing bed;

a predetermined flow passage through bypass acid neutralizing filter passing in sequence through the inlet port, the entrance port, the acid neutralizing bed, the particulate filter, the exit port and the outlet port;

wherein the bypass acid neutralizing filter is configured as a bypass type filter to handle less oil than that passed along the primary filtration path with the bypass particulate filter being sized substantially smaller than the primary particulate filter.

15. The acid neutralizing filter of claim 14, wherein the inner reactor housing comprises a bowl and a lid, and an entrance port and an exit port.

16. The acid neutralizing filter of claim 15, wherein the bowl includes an end wall and a tubular sidewall, the sidewall having a plurality of ribs that extend axially and that are angularly spaced.

17. The acid neutralizing filter of claim 16 wherein the particulate filter comprises a tubular filter media contained between end caps, and wherein the particulate filter is concentrically arranged inside of the ribs.

18. The acid neutralizing filter of claim 15, wherein the bowl and the lid of the reactor housing are molded from plastic material.

19. The acid neutralizing filter of claim 18, further comprising mesh material molded into the reactor housing over the entrance port for retaining particles of the acid neutralizing bed in the reactor housing.

20. The acid neutralizing filter of claim 14, wherein the bypass particulate filter comprises a tube of filter media, first and second end caps secured to opposing ends of the tube of filter media, a perforated center tube concentrically arranged inside of the tube of filter media and a cylindrical ring of mesh material between the tube of filter media and the perforated center tube.

21. The acid neutralizing filter of claim 20, wherein the first end cap has a central opening communicating with the exit port through the bowl and the second end cap is closed, and wherein the particular filter has an axially length that is substantially shorter than the reactor housing, such that the second end cap is spaced axially from the lid with acid neutralizing particles contained therebetween.

22. The acid neutralizing filter of claim 21, wherein the inner reactor housing defines said entrance and said exit ports proximate opposed axial ends of the inner reactor housing, wherein oil flow through the inner reactor housing is imparted with substantial axial and radial travel components.

23. The acid neutralizing filter of claim 15, wherein the bowl includes an end wall and a tubular sidewall terminating in a free end, the lid engaging the free end, and wherein the end wall defines a central opening providing said exit port communicating with the outlet port, and wherein the lid defines a plurality of said entrance ports, the reactor housing being arranged such that oil flows, in sequence, through the inlet port down an annular space defined between the inner reactor housing and the outer housing to a closed end outer housing, axially through entrance ports defined by the lid, substantially axially and substantially radially through the acid neutralizing bed, through the particular filter and then through the exit and outlet ports.

24. The acid neutralizing filter of claim 14, wherein the acid neutralizing particles consist essentially of crushed limestone particles.

* * * * *